United States Patent Office 2,891,014
Patented June 16, 1959

2,891,014

SULFONIC CATION EXCHANGE RESINS PREPARED IN THE PRESENCE OF PLASTICIZER AND POLYMER

Yoshio Tsunoda and Maomi Seko, Okatomi, Nobeokashi, Miyazaki-ken, Japan, assignors to Asahi Chemical Industry Co., Ltd., Osaka, Japan No Drawing. Application August 24, 1954
Serial No. 451,972

11 Claims. (Cl. 260—2.2)

This invention relates to the cation exchange resin polymer and their preparation and especially to the cation exchange resins of the sulphonic acid type having large dimensions and granular cation exchange resins, which are not fractured in any process of their preparation. This invention is concerned, more particularly, with the cation exchange resins prepared from the base polymer matrix comprising monovinyl arene compound and polyolefinic compound bonded to sulphonic acid and with their methods of preparation. This invention is concerned, especially, with the sulphonic acid type cation exchange resins having at least two dimensions each in excess of 1 cm., having a shape of sheet, rod, tube and with crack-proof granular sulphonic acid type cation exchange resins, which are not cracked in any step of their preparation e.g. polymerisation, sulphonation and washing etc.

There were known many synthetic cation exchange resins, but these resins are granules of small particle size, usually considerably below than 0.1 cm. in diameter. These granular resins have been used in a system in which they were either contacted with a solution until equilibrium has been reached or the solution has passed through a stationary bed of cation exchange granules. The purpose of these granular resins were absorption of cation and therefore they did not necessitate to prepare the cation exchange resins of large dimension. In the U.S. Patent No. 2,636,851 of W. Juda and W. A. MacRae, the ion exchange resins having at least two dimensions each in excess of 0.8 cm. were described, but this patent related only to the preparation of moulded diaphragm of Dowex 50, Amberlite IRC–50 or Amberlite IRA–400, and homogeneous membrane of condensed phenol sulphonic acid and formaldehyde, and condensed melamine guanidine and formaldehyde, and there were no descriptions about the preparation of homogeneous styrene-divinylbenzene series cation exchange resins having large dimensions. But, in this patent, regarding styrene-divinylbenzene series resins, only the granules of insoluble infusible ion exchange resins were used for the preparation of membrane, therefore, the binder was always necessary for their purpose. As the binder many sorts of materials such as thermoplastic polymers or phenolic condensates of considerable low molecular weight which comprises cation exchangeable groups were used. Therefore, in these cases, they could not be uniform polymeric materials and had many disadvantages. For instance, if the binder was a plastic material such as polystyrene, the surface of cation exchange resin was covered by the binder, and therefore, the stability and the functions of the cation exchange groups were considerably decreased, so that they become inferior in electrochemical performance, that is, could not be superior cation exchange resin membranes having high permselectivity for cation in electrolytic solution and high electric conductivity. When the granules of cation exchange resins of styrene-divinylbenzene series were covered by phenolic condensible binder, the stability and the functions of cation exchange resins of styrene-divinylbenzene series were quite decreased. On the contrary the cation exchange resins of this invention, however large the dimension of resins is, are homogeneous in their structure, entirely different from the usual ones, having high permselectivity for cation in an electrolytic aqueous solution and high electric conductivity. In spite of these disadvantages that the cation exchange group were covered by other material, usual method of the preparation of the cation exchange resins of large dimension could not help using a binder or other material especially for styrene-divinylbenzene series cation exchange resins. This was due to the fact that the base copolymer comprising monovinyl arene and polyolefinic compound was easily cracked during the polymerisation to prepare its large bulk base polymer matrix, and during the sulphonation of said matrix.

This invention has overcome these essential defects. Any size of, any form of homogeneous sulphonic acid type cation exchange resins are prepared without cracking in all steps of their preparation. Therefore, the various electrochemical characteristics are very much improved. In general, sulphonic acid type cation exchange resins of styrene-divinylbenzene series are prepared by the following processes:

(1) Preparation of insoluble infusible base polymer matrix comprising monovinyl arene and compound and polyolefinic compound.

(2) Bonding of sulphonic acid groups to said base polymer matrix by sulphonation.

This cation exchange group of —$SO_3H$ is so hydrophilic that the resin should be made to be insoluble by the cross-linking agent. In the bulk and solution polymerisation for the preparation of base polymer matrix having large dimension, or of the crack-proof granular base polymer, the larger the dimension of base polymer matrix and the more the content of crosslinking agent, the more remarkably the tendency towards cracking was observed. The usual granular ion exchange resins are exemplified in the following patents. But these patents did not aim essentially the unfractured cation exchange resins of large dimension or crack-proof granular cation exchange resins. In the cases of cation exchange resins, as described in the U.S. Patents Nos. 2,366,007 and 2,597,438, styrene and divinylbenzene monomers were completely copolymerized in finely divided granular forms, most conveniently by the suspension copolymerisation, and these granular copolymerzates were sulphonated. These known processes were not successful to prepare the cation exchange resins having large dimensions and crack-proof granular cation exchange resins, especially to prepare the cation exchange membranes. The reasons why the known processes were unsuccessful were that these base polymer matrices were easily cracked or fractured during the processes of their preparation. These circumstances are explained in details as following.

Sulphonic acid type cation exchange resins having at least two dimensions each in excess of 1 cm., could not be made by the usual method, because the cracks or fractures occurred in the process of polymerisation in bulk or solution of monovinyl arene compound monomer and of polyolefinic compound monomer, or in the process in which cation exchange groups are introduced to the above base polymer matrix. These examples which show abovementioned cracks and fractures are found in the U.S. Patents Nos. 2,466,675, 2,500,149 and Zeitschrift für physik. Chemie 201, 1–15, 1953. In the preparation of the usual granular sulphonic acid type cation exchange resins, they used to make pearl-like beads between 40 and 60 mesh by suspension copolymerisation of monovinyl arene compound monomer and polyolefinic compound monomer in an aqueous solution containing protective colloid. But the cracks were not so serious comparing with the case of this invention, whose purpose is to make resins having larger dimensions. According to these literatures, the followings are the cases in which cracks occurred in the preparation of sulphonic acid type cation exchange resins having at least two dimensions each in excess of 1 cm.

(1) Process in copolymerisation of monovinyl arene compound monomer and polyolefinic compound monomer.

(2) Process in sulphonation of the above base polymer matrix.

(3) Process to drain-off of sulphonating agents, and washing after sulphonation reaction.

The larger the size of the cation exchange resins, the more often it is necessary to have less swelling resins for its application than in case of small granules. For this purpose of obtaining less swelling resins, resins containing more polyolefinic compound monomer are required so that more crosslinking may be formed in the polymer matrix, while cracking happens more easily during the process of polymerisation of base polymer matrix, the reaction wherein the cation exchange groups are introduced and washing, as polyolefinic compound monomer increase in the base polymer matrix. As an example, followings are the explanation of the abovementioned characteristics of the cation exchange membrane of sulphonated styrene-divinylbenzene type.

It is impossible to obtain membrane of sulphonic acid type cation exchange resins by transforming sulphonated granular copolymer of styrene and divinylbenzene, as it is insoluble in any solvent and not softened nor fusible by heat. It is, therefore, required to make, first, membrane type base polymer matrix of styrene and divinylbenzene, in order to make sulphonic acid type cation exchange membrane. But the base polymer matrix having large area cannot be obtained, as it cracks, during the polymerisation, under the ordinary conditions same as or similar to that of preparation of granular styrene and divinylbenzene series copolymer in solution or bulk polymerisation. In a special case, the monomers can be polymerized at a lower temperature and with a longer period of polymerisation than usual, and an unfractured sheet formed base polymer matrix can be obtained. But the sheet obtained in this way cannot be sulphonated without cracks. Generally, the base polymer matrix swells in the step of sulphonation, and this swelling damages and destroys the structure of the said base polymer matrix. In almost all cases, therefore, the sheet form matrix of abovementioned styrene-divinylbenzene copolymer is reduced to small pieces and so the sulphonated cation exchange membrane can not be obtained successfully. Fractures occur more easily after the sulphonation. The sulphonated sheet form resin is reduced suddenly into small pieces, when the resin is taken out from the sulphuric acid after sulphonation and as soon as the resin is immersed into water to drain off the excess acid. If a sheetformed sulphonic acid type cation exchange resin is wanted, the washing off of the sulphuric acid must be done very carefully, therefore, the resin must be washed several times by using the several batches of the solution of gradually decreasing concentration. Furthermore this process usually takes a period of several weeks. These facts about cracks and fractures of the resin are clearly described in the Zeitschrift für physik. Chemie. 201, 1–15, 1953. This tendency towards cracks should be avoided in the preparation of usual granular cation exchange resins, and various protective measures were tried. But these measures were not always complete for the preparation of crack-proof granular resins.

However, we have now discovered quite new method for the preparation of base polymer matrix suitable for the sulphonated cation exchange resins having at least two dimensions each in excess of 1 cm., and crack-proof granular sulphonated cation exchange resins, which will never be damaged, nor cracked and nor fractured during the step of polymerisation and sulphonation of the base polymer matrix, and of the treating in which the polymerizates undergo swelling and shrinking regardless of the dimension of the resins. According to our invention, the linearly polymerizable monovinyl arene compound monomer is first partially polymerized into the liquid mixture containing partially polymerized polymerizate and monomer, which mixture contains more than 0.1% of the said partially polymerized polymerizate, and next the crosslinking agent such as polyolefinic compound is added to this solution and thus a clear uniform solution is obtained. This mixed solution is subjected to the polymerisation, and thereafter, sulphonic acid groups are bonded to this base polymer matrix, and thus cation exchange resin having at least two dimensions each in excess of 1 cm. and crack-proof granules are obtained. These base polymer matrices show quite different characteristics from the usual base polymer matrices which are obtained by the usual method of polymerisation starting from the monomers themselves. For instances, the base polymer matrix obtained by our process does not crack in the step of sulphonation or washing after sulphonation. The mechanical characteristics, such as the resistance to the bending etc. are also superior to the known polymerizates. Also usual base polymer matrices made of styrene and divinylbenzene are transparent, whereas that of our invention are white, turbid and opaque. They show different behavior in the case of extraction by the solvent for polystyrene, such as carbon tetrachloride. When extracted with solvent, there is some extract from the polymerizate prepared by our invention, whereas less extract from the polymerizate prepared by the usual process. This may be explained by that the partially polymerized part would no longer copolymerize with the divinylbenzene after partial polymerisation, but this partially polymerized part is bound to polymer matrix by forming the resinous three dimensionally crosslinked structure in the step of sulphonation, and thus the polymerizate becomes quite insoluble and infusible in aqueous solution. Furthermore, as clearly described in the U.S. Patent No. 2,466,675, if the usual granular sulphonated copolymerizates of monovinyl arene compound and polyolefinic compound are immersed in fresh water directly after sulphonation, the granular resin used to shatter immediately. Therefore, in order to avoid the shattering of the resin, the sulphonated granular cation resins must be immersed first into the concentrated salt solution, and concentration of said salt solution must be decreased gradually. By the same reason, the larger the dimension of the resin prepared by the known process, the more the accumulation of the strain due to the swelling and shrinking will result, and the resin will be shattered and spalled more easily. On the contrary, the resin prepared by this invention will not be shattered or spalled even if the resin is immersed into the fresh water directly after the sulphonation. These are the main differences of physical and chemical characteristics of the base polymer matrix prepared by the usual process and by the process of this invention. These relations are quite similar in all cases of preparation of other forms of sulphonated cation exchange resins such as rod, pipe etc.

Concrete method of our invention is shown as follows: A monovinyl arene compound monomer is partially polymerized to an extent of more than 0.1% by weight, and this solution which contains partially polymerized polymerizate and said monomer are mixed with polyolefinic compound with or without other inert material which is not polymerizable. This mixed solution is finally polymerized completely to form three dimensionally crosslinked insoluble, infusible base polymer matrix. The inert material may be added during the preparation of partial polymerisation. A catalyst may or may not be added in the step of partial polymerisation and of polymerisation with polyolefinic compound. Instead of partial polymerisation, polymer containing solution of monomer, which polymer is contained more than 0.1% by weight, is also applicable. The polymerizate thus obtained can be used as a base polymer matrix suitable for sulphonation. In this case, when the monovinyl arene compound monomer is polymerized first partially and this polymer containing solution of said monomer is copolymerized with polyolefinic compound, the base matrix thus obtained does not undergo any spalling or shattering in polymerisation and in sulphonation and washing after sulphonation or in the chemical reaction which causes swelling or shrinking. It, therefore, becomes now possible to make sulphonated cation exchange resins in any shape and any size. If a plasticizer is added in the course of polymerisation as a substance which is indifferent to the polymerisation, and the mixed solution is subjected to solution or bulk polymerisation, finished base polymer matrix may be easily cut in any desired shape. The plasticizer can be extracted easily with its solvent after the polymerisation. Also, filler or reinforcing material can be introduced as a substance which is indifferent to the polymerisation, and thus renders the polymerizate to reinforce, and these are considered as an useful method for practical application. Because of many kinds of monovinyl arene compound monomer and polyolefinic compound monomer, there are many sorts of said base polymer matrices having different components. However, this invention is applicable for all of the unfractured sulphonic acid type cation exchange resins having at least two dimensions each in excess of 1 cm. and crack-proof sulphonic acid type granular cation exchange resins.

The monovinyl arene compounds are selected from the benzene and naphthalene series, i.e. they contain not more than 10 carbon atoms in the aromatic nucleus, which monovinyl arene compounds may contain in addition to the vinyl radical, from 1 to 3 halogen or lower alkyl radicals other than a tertiary alkyl radical, attached to the aromatic nucleus. The alkyl substituents are preferably methyl radicals. Examples of such monovinyl arene compounds are styrene, α-methylstyrene, ar-methylstyrene, ar-dimethylstyrene, ar-ethylvinylbenzene, ar-chlorostyrene, vinylnaphthalene, ar-methylvinylnaphthalene, ar-sec-butylstyrene and ar-trimethylstyrene. The polyolefinic compound is selected from the compounds in which polymerizable double bonds exist at least two in one molecule. Examples of polyolefinic compounds are divinylbenzene, ar-divinyltoluene, ar-divinylxylene, ar-divinylchlorobenzene. divinylnaphthalene, ar-divinylethylbenzene, divinylether, butadiene, isoprene, bimethallyl, biallyl, trivinylbenzene, cyclopentadiene and similar polyolefinic hydrocarbons.

In the preparation of base polymer matrix suitable for sulphonated cation exchange resins from monovinyl arene compound and polyolefinic compound, monovinyl arene compound undergoes first partial polymerisation in the presence or absence of catalyst generally at a temperature of 60–150° C. The ratio of partially polymerized polymerizate to the total solution is preferably 6–20% for the convenience in mixing with the polyolefinic compound. To this solution, polyolefinic compound is added with or without catalyst and also with or without a substance which is indifferent to the polymerisation, and is mixed uniformly by stirring and polymerized until the polymerisation completes. As a catalyst in this case, usual vinyl polymerisation catalyst such as benzoylperoxide, lauroylperoxide, hydrogenperoxide, potassiumpersulphate, sodiumperborate and/or ammonium persulphate can be used. This complete polymerisation may be performed in a polymerisation vessel in bulk or solution polymerisation so that the finished polymer may have any shape such as sheet or rod form. As a substance which is indifferent to the polymerisation, a plasticizer may be used. The plasticizer is to be added preferably at a ratio of 20–50% to the monovinyl arene compound and afterwards polymerisation with polyolefinic compound is carried out completely. In this process, thus obtained polymerizate is worked easily in sheetformed resin. The plasticizer can be extracted by a solvent from the cut sheet and thus the base polymer matrix of monovinyl arene compound and polyolefinic compound can be obtained in any desired shape and size. As a plasticizer, common plasticizers such as aromatic and aliphatic compound may be used, but also a low molecular weight polymerizate which is made of the same monomer may be used as a plasticizer. A reinforcing material for the finished polymerizate such as suitable filler or web can be used as a substance which is indifferent to the polymerisation.

In order to prepare the crack-proof granular base polymer matrix, the solution which contains partially polymerized polymerizate of monovinyl arene compound, is mixed uniformly with the polyolefinic compound. Then the polymerisation is preferably accomplished by stirring, e.g. at a temperature of 50–150° C., a suspension of the said mixed polymer containing solution in an aqueous solution of protective colloid or thickening agent such as starch, gum tragacanth, or methylcellulose etc. By such polymerisation, while suspended in a liquid medium, insoluble base granular polymer matrix may be obtained directly in the form of rounded and nearly spherical granules. The size of granules may be controlled, e.g. by the rate of stirring and the proportion of protective colloid or thickening agent employed, so as to obtain nearly all of the product as granules of sizes suitable for introducing sulphonic acid groups.

The base polymer matrix obtained by the abovementioned process is to be sulphonated. The sulphonation is performed by using the known sulphonating agent such as sulphuric acid, oleum, chlorosulphonic acid., anhydrous sulphuric acid and sulphurtrioxide etc., and thus the sulphonic acid groups are introduced into base polymer matrix, without any crack during the sulphonation and in the process of draining off of sulphonating reagent after sulphonation.

In order to shorten the sulphonation reaction time, the polymerizate may be sulphonated after it is swollen by swelling agents. As swelling agents, benzene, toluene, xylene, isopropylbenzene, chlorobenzene, tetrachloroethane, trichloroethylene etc. can be used. The sulphonation is completed usually in 2 hours at a temperature of 50–200° C. The sulphonic acid group is introduced usually more than 0.1 per one aromatic nucleus. But from practical consideration, it is most desirable that at least half of the aromatic nucleus may contain at least one sulphonic acid group so that the product will have a reasonable capacity for absorbing cations. Actually the preferred product contains about one sulphonic acid group per aromatic nucleus, and the more the sulphonic acid groups are introduced into the polymerizate, the better the electrochemical properties of the product.

As abovementioned, for the preparation of the base polymer matrix having at least two dimensions each in excess of 1 cm. and crack-proof granular base polymer matrix, monovinyl arene compound is first polymerized partially and a solution which contains at least 0.1% of this partially polymerized polymerizate is prepared, to this solution crosslinking agent such as polyolefinic compound is added and mixed uniformly and finally this mixed solution is subjected to the complete polymerisation, whereas the known process is merely copolymerisation of the above cited monomers themselves. The base polymer matrix obtained by this invention is dimensionally very stable and will not be shattered or spalled in any step, such as shrinking and gelation during the polymerisation, and sulphonation. By sulphonation of this base polymer matrix, homogeneous sulphonic acid type cation exchange resin having at least two dimensions each in excess of 1 cm. and crack-proof sulphonic acid type granular cation exchange resins are obtained. The following examples illustrate the practice of this invention but are not to be construed as limiting the scope of the invention.

The following Examples 1–8 illustrate how the base polymer matrix suitable for sulphonic acid type cation exchange resins may be prepared.

EXAMPLE 1

400 parts of freshly distilled styrene was partially polymerized in the atmosphere of nitrogen and at a temperature of 100° C. for 12 hours. This partially polymerized polymerizate had a viscosity of about 900 poises and according to the analysis styrene monomer was about 25% polymerized. To this solution, 40 parts of divinylbenzene, 60 parts of ethylvinylbenzene, 120 parts of dimethylphthalate as a plasticizer and 0.4 part of benzoylperoxide as a polymerisation catalyst were added and mixed uniformly. The solution was next deaerated and subjected to solution polymerisation in the atmosphere of nitrogen at a temperature of 100° C. for 48 hours. The polymerizate thus obtained was a white turbid, opaque solid and was easily cut into sheets.

When the same amounts and the same substances were used, namely, 400 parts of distilled styrene, 40 parts of divinylbenzene, 60 parts of ethylvinylbenzene were mixed with the addition of 120 parts of dimethylphthalate and 0.4 part of benzoylperoxide and subjected to the polymerisation in an usual way, the polymerizate was cracked, spalled and shattered during the polymerisation and the polymerizate having large dimensions was hardly obtained. There were differences in physical characteristics in the polymerizates obtained by the present this invention and by the usual process, the former being white, turbid and opaque; whereas the latter transparent.

EXAMPLE 2

400 parts of distilled styrene was partially polymerized in a polymerisation vessel in the atmosphere of nitrogen. The partial polymerisation was carried out at a temperature of 80° C. for 15 hours. The solution thus obtained had a viscosity of about 80 poises and was about 6% polymerized according to the analysis. To this solution, 40 parts of divinylbenzene, 60 parts of ethylvinylbenzene, 120 parts of dibutylphthalate as a plasticizer and 0.4 part of benzoylperoxide was added and mixed uniformly. The solution was next deaerated and subjected to solution polymerisation in the atmosphere of nitrogen at a temperature of 100° C. for 55 hours. The polymerizate thus obtained was a white, turbid and opaque solid and was easily cut into sheets. When the same amount and same substances were used, namely, 400 parts of distilled styrene, 40 parts of divinylbenzene, 60 parts of ethylvinylbenzene were mixed with the addition of 120 parts of dimethylphthalate and 0.4 part of benzoylperoxide and subjected to the polymerisation in a usual way, the polymerizate was cracked, spalled and shattered during the polymerisation and the polymerizate having large dimensions was hardly obtained. There were differences in physical characteristics between the polymerizates obtained by the present invention and by the usual process, the former being white, turbid and opaque; whereas the latter transparent.

EXAMPLE 3

400 parts of distilled styrene was partially polymerized in a polymerisation vessel in the atmosphere of nitrogen. The partial polymerisation was carried out at a temperature of 100° C. for 12 hours. The solution thus obtained had a viscosity of about 900 poises and was about 25% polymerized according to the analysis. To this solution, 40 parts of divinylbenzene, 60 parts of ethylvinylbenzene and 0.4 part of benzoylperoxide were added and mixed uniformly. The mixture of the solution was, after deaeration, poured into a polymerisation vessel, of hexahedron form, the dimension of the internal sides being 50 cm. long, 50 cm. high, and the clearance between the both walls having the abovementioned size being 0.7 mm. The vessel was closed tightly by a lid and was immersed into a constant temperature bath and was subjected to bulk polymerisation at a temperature of 100° C. for 50 hours. After the polymerisation, a sheet-formed polymerizate having the dimension of about 50 cm. x 50 cm. area and 0.7 mm. thickness was obtained. The sheet was elastic, slightly white, turbid and opaque and had no crack nor fracture.

When the same amounts and the same substances were polymerized in the same polymerisation vessel at the same temperature of 100° C. in an usual way, there occurred many cracks, shatters and spalls during the polymerisation and even a polymerizate having the area of 5 cm. x 5 cm. could not be obtained. The fragment of this polymerizate was transparent.

EXAMPLE 4

The mixture of the solution which was deaerated in Example 2 was placed into the same polymerisation vessel and webs of glass fibre were inserted into the solution. In this way, reinforced polymerizates were obtained.

EXAMPLE 5

The blockform polymerizate which was obtained in Example 1 was worked by lathe to form any shape such as rod or pipe. After the work, the plasticizer was extracted with alcohol and thus rodform or pipeform polymerizate were obtained.

EXAMPLE 6

400 parts of distilled styrene was partially polymerized according to Example 1. To this solution 20 parts of divinylbenzene, 30 parts of ethylvinylbenzene and 20 parts of butadiene were added as crosslinking agents. 0.4 part of benzoylperoxide as a polymerisation catalyst was added and this mixed solution was subjected to solution polymerisation at a temperature of 100° C. for about 15 hours in a pressure tight vessel.

A polymerizate of similar physical characteristics to those of Example 1 was obtained.

EXAMPLE 7

Instead of the solution which contains partially polymerized polymerizate in Examples 1–6, 60 parts of commercial polystyrene was pulverized and dissolved into 340 parts of distilled styrene, and this polymer containing solution was used for copolymerisation. The further steps were the same as described in Examples 1–6 and the same polymerizate was obtained.

EXAMPLE 8

A mixture of 370 parts of freshly distilled styrene and 30 parts of m-vinyltoluene was partially polymerized in the atmosphere of nitrogen and at a temperature of 100° C. for 11 hours. This partially polymerized polymerizate had a viscosity of about 800 poises, and according to the analysis styrene and vinyltoluene monomer was about 22% polymerized. To this solution, 40 parts of divinylbenzene, 60 parts of ethylvinylbenzene, and 120 parts of dimethylphthalate as a plasticizer were added and mixed uniformly. The mixed solution was subjected to solution polymerisation in the atmosphere of nitrogen at a temperature of 100° C. for 48 hours. The polymerizate thus obtained was a white, turbid and opaque solid and was easily cut into sheets same as in Example 1.

The following Example 9 illustrates how the base polymer matrix obtained according to the processes described in Examples 1–8 may be sulphonated for the preparation of cation exchange resin.

EXAMPLE 9

Polymer sheets having the dimensions of 0.7 mm. x 20 cm. x 20 cm. were obtained according to the process described in Examples 1-8. The sheets thus obtained according to Examples 1-8 were immersed into 98% sulphuric acid solution at a temperature of 95° C. for 8 hours. After the sulphonation, the excess acid was drained off and the sheets were thrown into the fresh water directly in order to remove excess acid. The sheets were then washed in 1 N. sodium chloride solution until the sheets were neutralised completely. The transport number of sodium ion of these cation exchange resin sheets were measured in 1.5 N. sodium chloride solution at a temperature of 25° C. The transport number was measured as follows: a cell was divided into two by this sheet, which served as separating wall for both cells, and 1 N. and 2 N. sodium chloride solutions were filled each in these rooms separately. Two silver chloride electrodes were inserted into two rooms separately and the electrical potential difference of these electrodes were measured. From these potential values, the transport number was calculated by usual method. The specific electric conductivity of these cation exchange sheets were measured in 0.5 N. sodium chloride solution at a temperature of 25° C. These results were illustrated in the following table.

*Table*

| | Transport number of sodium ion in 1.5 N.NaCl solution at 25° C. (percent) | Specific electric conductivity in 0.5 N.NaCl solution at 25° C. ($\Omega^{-1}cm.^{-1}) \times 10^{-3}$ |
|---|---|---|
| cation exchange resin from the base polymer matrix of: | | |
| Example 1 | 80 | 30 |
| Example 2 | 76 | 32 |
| Example 3 | 83 | 28 |
| Example 4 | 83 | 24 |
| Example 5 | 80 | 30 |
| Example 6 | 78 | 34 |
| Example 7 | 83 | 29 |

On the contrary, when the polymerizate was made according to the usual bulk polymerisation, the polymerizate having the dimensions of 0.7 mm. x 20 cm. x 20 cm. was unable to get because of shattering and crumbling during the polymerisation. Only small pieces having the area of about 2 cm. x 1 cm. were obtained from the fragments of the polymerizate. When these small pieces were subjected to the sulphonation under the same condition as described in this example, the pieces were shattered and spalled into smaller pieces due to the swelling during the sulphonation. An attempt was made to get a sheetformed polymerizate under the milder condition from styrene and divinylbenzene monomers according to the usual known process, using lauroylperoxide as a polymerisation catalyst at a temperature of 70° C. for 100 hours. A polymerizate having an area of 10 cm. x 10 cm. was obtained and was subjected to sulphonation according to the process same as described in this example. These sheets were shattered and spalled also into small pieces of about 1 mm. size due to the uneven swelling during the sulphonation.

A polymerizate of any shape was to be obtained according to the processes described in Examples 1-8, and this polymerizate was sulphonated according to the process described in this example and thus cation exchange resins of any shape were to be obtained. The sulphonating reaction may be accomplished also by using chlorosulphonic acid, oleum, anhydrous sulphuric acid and sulphurtrioxide besides sulphuric acid.

EXAMPLE 10

A polymerizate having the dimensions of 0.7 mm. x 10 cm. x 10 cm. was obtained by the process described in Examples 1-7 and was dipped in tetrachloroethane. The polymerizate was swollen and was subjected to the sulphonation which was completed more quickly than unswollen polymerizate.

EXAMPLE 11

400 parts of distilled styrene was polymerized partially at a temperature of 100° C. for 10 hours in the atmosphere of nitrogen. The solution was about 20% polymerized according to the analysis. The solution was then added with 40 parts of divinylbenzene and 60 parts of ethylvinylbenzene and was mixed well. The solution was then mixed with 10,000 parts of aqueous solution which contained 0.7% of sodium salt of carboxylmethylcellulose and stirred well. The whole solution was then subjected to suspension polymerisation and the temperature was raised from 60° C. to 90° C. in 60 hours. After the polymerisation, granular polymerizates were obtained and they had the same physical characteristics as the polymerizates obtained in the preceding examples, being different from those obtained by the usual known process.

About 90% of the granular polymerizates had a size between 20 and 40 mesh and these granules were subjected to sulphonation in 98% sulphuric acid solution, at a temperature of 160° C. for 4 hours. The sulphonated granules were drained off from excess acid and thrown into the water. There was no shattering and spalling observed during the sulphonation and washing. For comparison, the granular polymerizates were prepared according to the usually known process and subjected to the sulphonation and washing. The ratio of the shattering, spalling and crumbling to the initial granules during the sulphonation and washing were observed as follows:

Granules obtained by:   Percent of granules cracked
The process of this invention _____ 1
The usually known process _____ 96

What we claim is:

1. A solid unfractured cation exchange resin having at least two dimensions each in excess of one cm., and comprising a three dimensionally crosslinked polymer matrix bonded to cation exchange groups; said matrix being a polymerization product of a solution mixture of (1) styrene, (2) polystyrene, (3) divinylbenzene, and (4) dialkylphthalate as a plasticizer, said mixture containing from 20% to 90% by weight of styrene, from 0.05% to 27% by weight of polystyrene, from 0.5% to 27% by weight of divinylbenzene and from 10% to 50% by weight of dialkylphthalate, and said cation exchange groups being sulfonic acid groups introduced by sulfonation of said matrix.

2. The article defined by claim 1, wherein the alkyl groups of said dialkylphthalate contain from 1 to 8 carbon atoms.

3. A granular cation exchange resin comprising a crosslinked granular polymer matrix bonded to cation exchange groups; said matrix being a polymerization product of a solution mixture of (1) styrene, (2) polystyrene, (3) divinylbenzene, and (4) a dialkylphthalate as a plasticizer, said mixture containing from 20% to 90% by weight of styrene, from 0.05% to 27% by weight of polystyrene, from 0.5% to 27% by weight of divinylbenzene and from 10% to 50% by weight of dialkylphthalate, and said cation exchange groups being sulfonic acid groups introduced by sulfonation of said matrix.

4. The article defined in claim 3, wherein the number of carbon atoms of the alkyl radicals of the plasticizer is from 1 to 8.

5. A solid unfractured cation exchange resin composition having at least two dimensions each in excess of one cm., and comprising a sulfonated crosslinked polymer matrix; said matrix being a polymerization product of a solution mixture of (1) styrene, (2) polystyrene, (3) divinylbenzene, and (4) a dialkylphthalate as a plasticizer, said mixture containing from 20% to 90% by weight of styrene, from 0.05% to 27% by weight of polystyrene, from 0.5% to 27% by weight of divinylbenzene and from 10% to 50% by weight of dialkylphthalate, and said matrix containing sulfonic acid groups on the aromatic nuclei, the number of sulfonic acid groups being one to five for every four aromatic nuclei in said matrix.

6. A granular cation exchange resin composition, comprising a sulfonated crosslinked granular polymer matrix; said polymer matrix being a polymerization product of a solution mixture of (1) styrene, (2) polystyrene, (3) divinylbenzene, and (4) a dialkylphthalate as a plasticizer, and said mixture containing from 20% to 90% by weight of styrene, from 0.05% to 27% by weight of polystyrene, from 0.5% to 27% by weight of divinylbenzene, and from 10% to 50% by weight of dialkylphthalate, and said matrix containing sulfonic acid groups on the aromatic nuclei, the number of sulfonic acid groups being one to five for every four aromatic nuclei in said matrix.

7. A solid unfractured cation exchange resin sheet comprising a three dimensionally crosslinked sheet form polymer matrix bonded to cation exchange groups; said sheet form matrix being sliced from block form matrix into sheet form matrix, and said block form matrix being a polymerization product of a solution mixture of (1) styrene, (2) polystyrene, (3) divinylbenzene, and (4) dialkylphthalate as a plasticizer, said mixture containing from 20% to 90% by weight of styrene, from 0.05% to 27% by weight of polystyrene, from 0.5% to 27% by weight of divinylbenzene and from 10% to 50% by weight of dialkylphthalate, and said cation exchange groups being sulfonic acid groups introduced by sulfonation of said sheet form matrix.

8. A solid unfractured cation exchange resin sheet comprising a three dimensionally crosslinked sheet form polymer matrix bonded to cation exchange groups; said sheet form matrix being sliced from the block form matrix, and said block form matrix being a polymerization product of a solution mixture of (1) styrene, (2) polystyrene, (3) divinylbenzene, and (4) a dialkylphthalate as a plasticizer, said mixture containing from 20% to 90% by weight of styrene, from 0.05% to 27% by weight of polystyrene, from 0.5% to 27% by weight of divinylbenzene, and from 10% to 50% by weight of dialkylphthalate, and said sheet form matrix containing sulfonic acid groups on the aromatic nuclei, the number of sulfonic acid groups being one to five for every four aromatic nuclei in said matrix.

9. A process for preparing the cation exchange resin sheet which comprises the steps of polymerizing in block form a solution mixture of from 20% to 90% by weight of styrene, from 0.05% to 27% by weight of polystyrene, from 0.5% to 27% by weight of divinylbenzene, and from 10% to 50% by weight of dialkylphthalate, slicing the polymerized block form matrix into sheet form matrix, and sulfonating the sheet form matrix.

10. The process for preparing the cation exchange resin sheet which comprises the steps of polymerizing in the block form a solution mixture of from 20% to 90% by weight of styrene, from 0.5% to 27% by weight of polystyrene, from 0.5 to 27% by weight of divinylbenzene, and from 10% to 50% by weight of dialkylphthalate, slicing the polymerized block form matrix into sheet form matrix, and sulfonating the sheet form matrix to an extent that the number of sulfonic acid groups is one to five for every four aromatic nuclei in said matrix.

11. A solid unfractured cation exchange resin having at least two dimensions each in excess of one cm., and comprising a three dimensionally crosslinked polymer matrix bonded to cation exchange groups; said matrix being a polymerization product of a solution mixture of 400 parts by weight of styrene which is 6 to 25% polymerized, 40 parts by weight of divinylbenzene, 60 parts by weight of ethylvinylbenzene, and 120 parts by weight of di(lower alkyl)phthalate, and said cation exchange groups being sulfonic acid groups introduced by sulfonation of said matrix.

References Cited in the file of this patent

UNITED STATES PATENTS

| | | |
|---|---|---|
| 2,318,845 | Feagin et al. | May 11, 1943 |
| 2,418,978 | Mertens | Apr. 15, 1947 |
| 2,420,284 | Carswell | May 6, 1947 |
| 2,468,094 | Marks | Apr. 26, 1949 |
| 2,500,149 | Boyer | Mar. 14, 1950 |
| 2,500,598 | Alelrod | Mar. 14, 1950 |
| 2,527,300 | Dudley | Oct. 24, 1950 |
| 2,665,400 | Walker | Jan. 5, 1954 |
| 2,697,080 | D'Alelio | Dec. 14, 1954 |
| 2,700,185 | Lee | Jan. 25, 1955 |
| 2,730,768 | Clarke | Jan. 17, 1956 |
| 2,731,408 | Clarke | Jan. 17, 1956 |
| 2,731,411 | Clarke | Jan. 17, 1956 |
| 2,732,350 | Clarke | Jan. 24, 1956 |
| 2,734,044 | Bezman | Feb. 7, 1956 |

OTHER REFERENCES

Chemical & Engineering News, vol. 30, No. 43, Oct. 27, 1952, page 4513. (Copy in Scientific Library.)